July 16, 1968 — J. P. GAGLIARDO — 3,392,920
DUAL OUTLET VALVE
Filed Aug. 29, 1966 — 2 Sheets-Sheet 1

INVENTOR.
JOHN P. GAGLIARDO
BY Meyer, Tilberry & Body
ATTORNEYS.

July 16, 1968  J. P. GAGLIARDO  3,392,920
DUAL OUTLET VALVE

Filed Aug. 29, 1966                                        2 Sheets-Sheet 2

INVENTOR.
JOHN P. GAGLIARDO
BY
Meyer, Tilberry & Body
ATTORNEYS

United States Patent Office 3,392,920
Patented July 16, 1968

3,392,920
DUAL OUTLET VALVE
John P. Gagliardo, Shrewsbury, Mass., assignor to
E. W. Bliss Company, Canton, Ohio, a corporation
of Delaware
Filed Aug. 29, 1966, Ser. No. 575,889
6 Claims. (Cl. 239—446)

ABSTRACT OF THE DISCLOSURE

An improved valve of the type including a valve chamber having an inlet and first and second outlets. A valve element having an outer surface and a through-flow passageway is rotatably mounted in the chamber and controls flow from the inlet to the two outlets. The element is arranged so that when it is in a position blocking flow through one of the said outlets it divides the valve chamber into two portions, a first portion communicated with the inlet through a recess in the outer surface of the element, and the second portion directly communicated with the unblocked outlet. Additionally, the element is provided with means, including the through-flow passageway, which communicate the two chamber portions.

---

This invention is directed to the art of valves and more particularly to an improved valve arrangement to selectively direct liquid flow from a single inlet through one of two outlets.

The invention is particularly applicable for use in a dual outlet nozzle of the type used in fire fighting and will be described with particular reference thereto; however, it should be appreciated that the invention is capable of broader application and may be used wherever it is desired to direct fluid or liquid flow from an inlet through a selected one of a pair of outlets.

It is well known in the nozzle art to provide nozzles having dual outlets. For example, nozzles used in fire fighting are often designed with two separate outlets. One outlet is usually connected to a straight flow nozzle, and the other is usually communicated with a fogging nozzle. Generally, a valve is provided to selectively direct flow through one or the other of the separate nozzles. The valve often comprises a rotatable ball or plug-type valve element having a plurality of flow passages formed therethrough. By rotation of the element, these passages selectively connect the inlet with one or the other of the nozzles.

Because of the multiple valving functions of these ball or plug-type valve elements, the ball or plug has to be relatively large to provide sufficient valving surface on the exterior of the element and to permit passages having the desired cross-sectional flow area to be formed through the ball or plug. As a result, the material required to form these valve elements becomes substantial. Further, the necessity of forming a plurality of flow passages through the elements makes fabrication difficult and time-consuming. Consequently, the cost of producing such valve elements becomes relatively large.

The present invention overcomes these problems and provides a dual outlet nozzle having an improved ball-type valve element. The valve element is designed in a manner which permits a relatively small element to control the flow of a large stream of liquid. Further, because of the configuration of the element, fabrication problems are greatly simplified.

In accordance with one aspect of the present invention, a valve is provided having a valve chamber with an inlet and first and second outlets connected thereto. A ball-type valve element having a through-flow passageway is rotatably mounted in the valve chamber and means are provided to rotate the element between three positions. In a first position, a portion of the outer surface of the element blocks flow from the inlet to the valve chamber. In a second position, the flow passageway directly connects the inlet and the first outlet. In a third position, a portion of the outer surface of the element blocks flow from the valve chamber to the first outlet. To provide flow from the inlet to the valve chamber and the second outlet, when the element is in the third position, a recess is formed in the outer surface of the element.

In accordance with a more limited aspect of the invention, an improved valve element is provided. This element comprises a generally spherical body with a through-flow passageway extending therethrough. A recess is also formed in the outer surface of the body adjacent one end of the flow passageway.

Since only one through-flow passageway extends through the body of the valve element, the size of the element can be substantially smaller and consequently lighter than prior valve elements of equal flow regulating capacity having a plurality of through-flow passageways. Further, the simplicity of the valve element's configuration makes it substantially easier to manufacture.

A primary object of the present invention is the provision of a dual outlet nozzle having a valving arrangement which permits a valve element of relatively small size to control the flow of a stream having a large cross-sectional area.

A further object of the present invention is the provision of a valving arrangement for a duel outlet nozzle that is light in weight and inexpensive to manufacture.

An additional object of the present invention is the provision of a three-way valve in which a single ball-type valve element having a single through-flow passageway is adapted to selectively control flow through a pair of outlets.

A further object of the present invention is the provision of a simplified and easily manufactured ball-type valve element.

These and other objects and advantages will become apparent from the following description used to illustrate the preferred embodiment of the invention when read in connection with the accompanying drawings in which.

Figure 1:
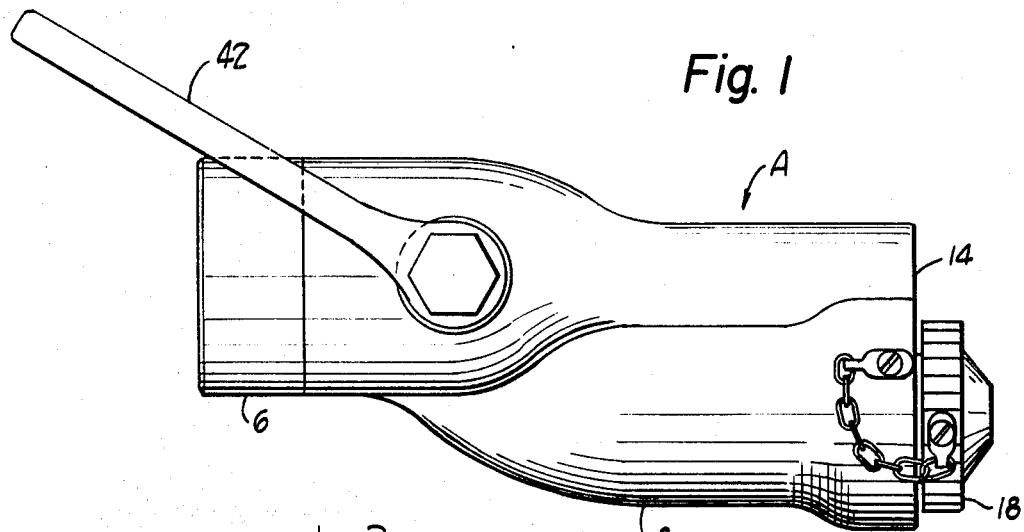
FIGURE 1 is a side elevation of a nozzle formed according to the present invention.

Referring now to the drawings wherein the showings are for the purpose of illustrating a preferred embodiment of the present invention only and not for the purpose of limiting same, FIGURE 1 shows the overall arrangement of the nozzle comprised of body sections 6 and 8, control handle 42, straight flow nozzle 14 and fogging nozzle 18.

Figure 2:
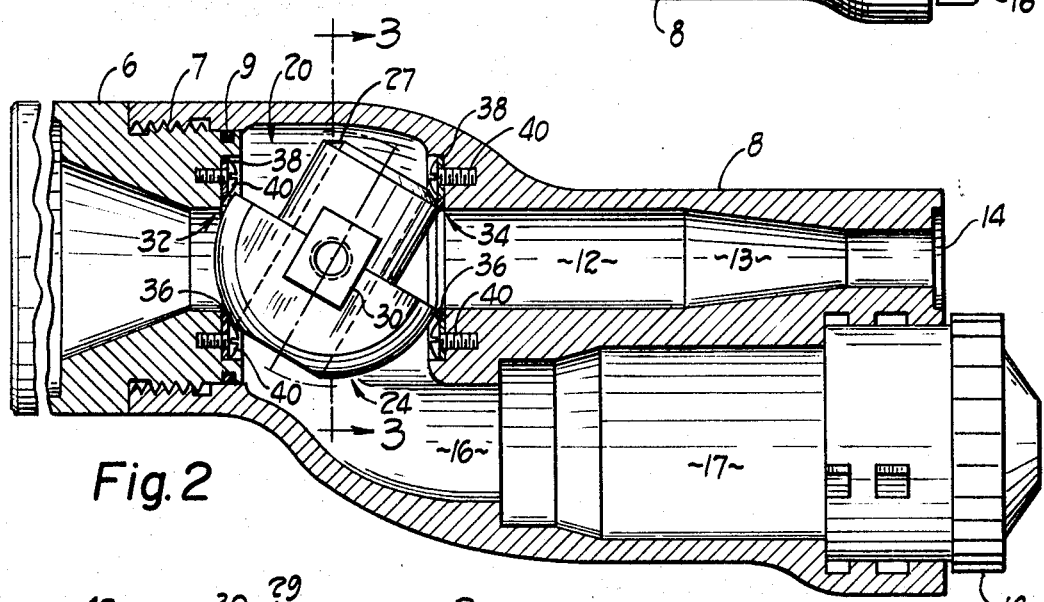
FIGURE 2 is a cross-sectional view showing in detail the various features of the invention.

As best shown in FIGURE 2, body sections 6 and 8 are connected in sealed relation by threaded portion 7 and O-ring 9. An inlet 10 is formed through body section 6 and connects with outlets 12 and 16 through a valve chamber 20 formed in body section 8. As can be seen, inlet 10 is axially aligned with outlet 12. Also formed in body section 8 are outlet chambers 13 and 17 which are respectively connected to straight flow nozzle 14 and fogging nozzle 18.

Figure 4:
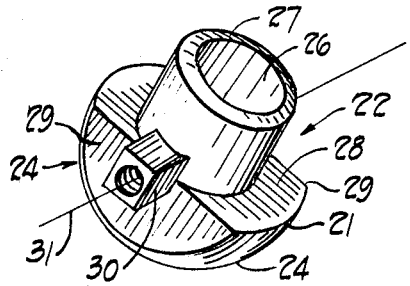
FIGURE 4 is a pictorial view of the valving element of the present invention.

Positioned within valve chamber 20 is valve element 22. This element can be manufactured in a variety of ways, such as by machining or casting. As best shown in FIGURE 4, valve element 22 comprises a generally spherical body 24 with a circular flow passageway 26 extending therethrough. The flow passageway is positioned so that its longitudinal axis coincides with a diameter of the spherical body.

Formed in body 24, circumferentially around one end of the flow passageway 26, is an annular recess 28. This recess extends from a circumference of the body, as determined by a plane perpendicular to the axis of the flow passage, to a point closely adjacent the end of the passage. In order to further reduce the size and weight of the element, the opposite sides are flattened, producing planar surfaces 29. These surfaces extend generally parallel to the axis of the flow passageway 26. Although it is not absolutely necessary that these surfaces be formed, they do reduce the width of the element, and thus permit the width of the valve chamber to be reduced. Further, these flattened portions, in one position of the valve element, permit fluid to flow around the element, as well as through the center flow passageway.

A pair of internally threaded mounting lugs 30 extend perpendicularly from both surfaces 29. The lugs 30 are positioned so that their central axis 31 coincides with a diameter of the body that is perpendicular to the axis of flow passageway 26. The annular surface 27 and the lower generally hemispherically shaped surface 21, which remain after the recess 28 and planar surfaces 29 have been formed, serve as the valving surfaces.

Figure 3:
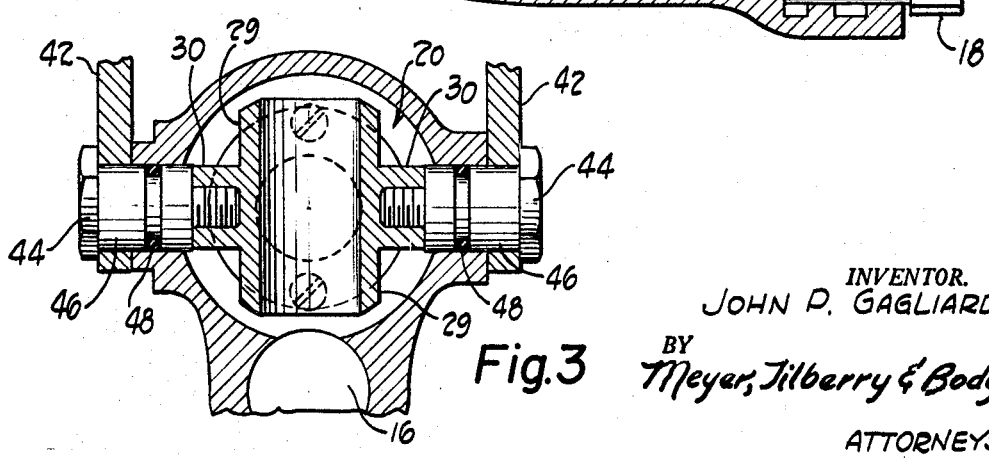
FIGURE 3 is a cross-sectional view taken on line 3—3 of FIGURE 2.

As shown in FIGURE 3, valve element 22 is rotatably mounted in valve chamber 20 by rotatable actuating pivots 46 which extend through openings in body section 8 and are sealed relative thereto by O-rings 48. Actuating pivots 46 are joined to valve element 22 by bolts 44 threaded into the lugs 30. A U-shaped actuating handle 42 is connected at its leg ends to pivots 46. The leg ends of the handle are pinned or otherwise keyed to the actuating pivots so that movement of the handle causes corresponding movement of the pivots and the valve element.

As shown in FIGURE 2, valve seats 32 and 34 are provided in inlet 10 and outlet 12 respectively. The particular manner of constructing these valve seats is not important; however, in the preferred embodiment these valve seats are shown as being formed from O-rings 36 held in place by ring retainers 38 and screws 40.

Figure 5:
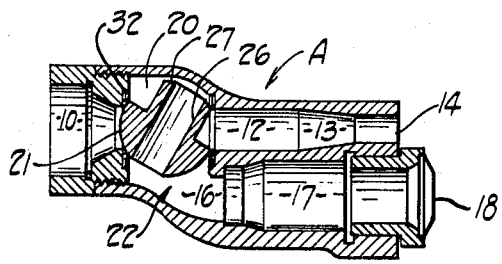
FIGURE 5 is a sectional view showing the valving element in the closed position.
Figure 6:
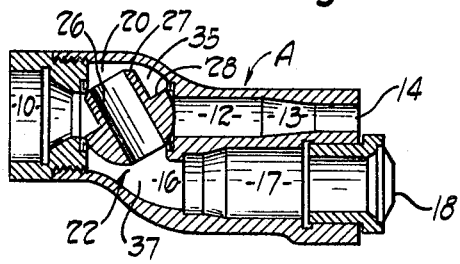
FIGURE 6 is a sectional view showing flow being directed to the fogging nozzle.
Figure 7:
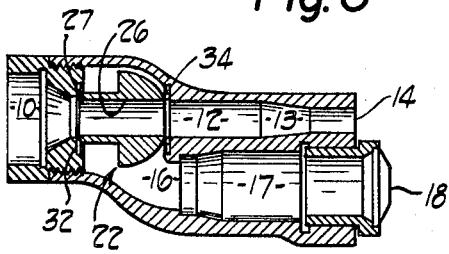
FIGURE 7 is a sectional view showing the valving element in position to direct the flow through the straight flow nozzle.

Referring now to FIGURES 5, 6 and 7, the various positions of valve element 22 and its effect on flow through the nozzle will be described. In the position shown in FIGURE 5, the left portion of generally hemispherical valving surface 21 is in contact with valve seat 32. This completely seals off flow through the inlet of the nozzle. When the element has been rotated to the position shown in FIGURE 6, the element generally divides the valve chamber into an upper portion 35 and a lower portion 37. In this position, the right hand portion of valving surface 21 is in contact with valve seat 34. This blocks flow from the valve chamber to the outlet 12. However, the inlet is open and the fluid can flow through the recess 28 into the upper portion 35 of the valve chamber. From there, the fluid flows around the valve element 22, past the flattened surfaces 29, and also, through the through-flow passageway 26, to the lower portion 37 of the valve chamber. The rotation of the valve element to the position shown in FIGURE 7 causes annular valving surface 27 to be in contact throughout its extent with valve seat 32. Also, in this position, the portion of valving surface 24 immediately surrounding the opposite end of the flow passageway 26 is in sealed relation with valve seat 34. Thus, all the flow entering inlet 10 is directed through straight through-flow passageway 26 to outlet 12. This provides a smooth laminal flow connection for the water flowing to outlet nozzle 14.

In view of the above, it can be seen that a ball-type valve element having only a single centrally located flow passageway has been provided which is capable of controlling flow to either of a selected pair of outlets. Because of the unique design of this valving element, a flow stream of relatively large cross-sectional area can be controlled by a valve element of small size. Further, because of the arrangement of this valve element relative the inlet and outlets, the flow from the inlet through one of the outlets is completely laminal. Consequently, no turbulances are produced in the liquid flowing to straight-through nozzle 14. Thus, the flow from this nozzle does not tend to break up and flare out.

The invention has been described in detail sufficient to enable one skilled in the art of flow nozzles to duplicate the invention. Obviously, modifications and alterations of the preferred embodiment described will occur to others upon a reading and understanding of this specification, and it is my intention to include all such modifications and alterations as part of my invention insofar as they come within the scope of the appended claims.

Having thus described my invention, I claim:

1. In a valve having a valve chamber with an inlet and first and second outlets communicated therewith; a ball-type valve element mounted in said valve chamber; said valve element having an outer surface and a through-flow passageway and being mounted for rotation within said chamber; means for rotating said element between a first, a second, and a third position; when said element is in said first position, a portion of said outer surface is blocking flow from said inlet into said valve chamber; when said element is in said second position, said through-flow passageway is directly connecting said inlet with said first outlet; and when said element is in said third position, a portion of the outer surface of said valve element is blocking flow from said valve chamber to said first outlet and allowing flow from said inlet to said second outlet; the improvement comprising: the outer surface of said valve element generally dividing said chamber into first and second portions when said element is in said third position, with said first portion being communicated with said inlet, and said second portion being communicated with said second outlet, and said through-flow passageway communicating said two chamber portions; and, a recess means formed in the outer surface of said valve element for communicating said inlet with said valve chamber and said valve chamber with said second outlet when said valve element is in said third position.

2. The improvement of claim 1 wherein said first and second portions of said valve chamber are further communicated by flattened portions formed on opposite sides of said valve element.

3. The improvement of claim 1 wherein said recess means is formed in said surface adjacent one end of said through-flow passageway.

4. In a valve having a valve chamber with an inlet and first and second outlets communicated therewith; a ball-type valve element mounted in said valve chamber; said valve element having an outer surface and a through-flow passageway and being mounted for rotation within said chamber; means for rotating said element between a first, a second, and a third position; when said element is in said first position, a portion of said outer surface is blocking flow from said inlet into said valve chamber; when said element is in said second position, said through-flow passageway is directly connecting said inlet with said first outlet; and when said element is in said third position, a porton of the outer surface of said valve element is blocking flow from said valve chamber to said first outlet and allowing flow from said inlet to said second outlet; the improvement comprising: a recess means formed in the outer surface of said valve element for communicating said inlet with said valve chamber and said chamber with said second outlet when said valve element is in said third position; said recess means extending circumferentially around one end of said through-flow passageway.

5. A valve element for use in controlling flow from an inlet to a selected one of a pair of outlets comprising: a body having a spherical outer surface, a flow passageway formed through said body and having a central axis which coincides with a diameter of said body; and, a recess formed in said outer surface adjacent one end of said flow passageway and extending circumferentially about said flow passageway.

6. A valve element for use in controlling flow from an inlet to a selected one of a pair of outlets comprising: a body having a spherical outer surface, a flow passageway formed through said body and having a central axis which coincides with a diameter of said body; and, a recess formed in said outer surface adjacent one end of said flow passageway and extending from a position adjacent one end of said flow passageway to the circumference of said body determined by a plane perpendicular to said central axis of said flow passageway.

References Cited

UNITED STATES PATENTS

| | | | |
|---|---|---|---|
| 2,820,676 | 1/1958 | Cleaves | 239—446 |
| 3,106,937 | 10/1963 | Sands | 239—446 X |

SAMUEL F. COLEMAN, *Primary Examiner.*